(12) United States Patent
Ohta

(10) Patent No.: US 8,054,726 B2
(45) Date of Patent: Nov. 8, 2011

(54) PROCESSOR AND PROCESSING PROGRAM

(75) Inventor: Yoshiki Ohta, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1233 days.

(21) Appl. No.: 11/666,007

(22) PCT Filed: Oct. 7, 2005

(86) PCT No.: PCT/JP2005/018656
§ 371 (c)(1),
(2), (4) Date: Apr. 23, 2007

(87) PCT Pub. No.: WO2006/043437
PCT Pub. Date: Apr. 27, 2006

(65) Prior Publication Data
US 2008/0137508 A1 Jun. 12, 2008

(30) Foreign Application Priority Data
Oct. 21, 2004 (JP) .................................. 2004-306774

(51) Int. Cl.
*G11B 7/00* (2006.01)
(52) U.S. Cl. .... 369/85; 369/47.12; 369/53.2; 369/53.21
(58) Field of Classification Search ............ 369/85, 369/53.2, 53.21, 47.12
See application file for complete search history.

(56) References Cited

U.S. PATENT DOCUMENTS
2002/0188461 A1* 12/2002 Matsumoto ...................... 705/1

FOREIGN PATENT DOCUMENTS

| JP | 5-225335 A | 9/1993 |
|---|---|---|
| JP | 7-141101 A | 6/1995 |
| JP | 2000-82145 A | 3/2000 |
| JP | 2000-200475 A | 7/2000 |
| JP | 2002-216131 A | 8/2002 |
| JP | 2002-259528 A | 9/2002 |
| JP | 2002-328925 A | 11/2002 |
| JP | 2003-323181 A | 11/2003 |

OTHER PUBLICATIONS

Toshiyuki Masui et al., "Mousefield: A Simple and Versatile Input Device for Ubiquitous Computing.", UbiComp2004, 2004, pp. 319-328, Springer LNCS3205.
Koji Tsukada et al., "Mousefield: Augmentation of Daily Commodities using the 'Put and Move' Idiom", National Institute of Advanced Industrial Science and Technology, Interaction 2004 Papers, 2004, pp. 45-46.

* cited by examiner

Primary Examiner — Adam R Giesy
(74) Attorney, Agent, or Firm — Sughrue Mion, PLLC

(57) ABSTRACT

An object of the present invention is to retrieve and process a piece of content to be processed by a simple method at the time of storing content recorded in a CD into an HDD or the like, reading desired content out of the content stored in the HDD from the HDD, and performing a process such as reproduction on the read content.

A processor of the invention includes: a storage 1 for storing at least one piece of information so as to be associated with jacket image information of an image related to the content; means for obtaining target medium image data by capturing an image of a jacket of a CD related to the content to be reproduced; means for collating the target medium image data with jacket image information stored in the storage 1 and obtaining the content corresponding to the target medium image data from the storage 1; and means for reproducing the obtained content.

12 Claims, 13 Drawing Sheets

CONTENT CORRESPONDENCE TABLE
STORED IN STORAGE 1

| JACKET IMAGE DATA Dj1 | CONTENT C1 |
| --- | --- |
| JACKET IMAGE DATA Dj2 | CONTENT C2 |
| JACKET IMAGE DATA Dj3 | CONTENT C3 |
| JACKET IMAGE DATA Dj4 | CONTENT C4 |
| ⋮ | ⋮ |
| JACKET IMAGE DATA Djn | CONTENT Cn |

FIG. 8

| RECTANGULAR REGION INFORMATION L(t) | SIZE LS(t) | UPPER LEFT COORDINATES LT(t) |
|---|---|---|
| L(0) | LS(0) | LT(0) |
| L(1) | LS(1) | LT(1) |
| L(2) | LS(2) | LT(2) |
| L(3) | LS(3) | LT(3) |
| ⋮ | ⋮ | ⋮ |

COMMAND CORRESPONDENCE TABLE
STORED IN STORAGE 1

| DIRECTION REFERENCE VECTOR | COMMAND INFORMATION F | COMMAND |
|---|---|---|
| (−1, 0) | F1 | REPRODUCE THE PRECEDING MUSIC |
| (1, 0) | F2 | REPRODUCE THE NEXT MUSIC |
| (0, −1) | F3 | VOLUME DOWN |
| (0, 1) | F4 | VOLUME UP |

PROCESSOR AND PROCESSING PROGRAM

TECHNICAL FIELD

The present invention relates to a processor and a processing program and, more particularly, to an information obtaining process having a storage for storing information and for obtaining one piece of information to be processed from information stored in the storage using an image related to the information as an access key.

BACKGROUND ART

In recent years, an information recording/reproducing apparatus capable of performing so-called CD ripping, that records content such as music data recorded in a CD into an HDD is known. By such an apparatus, the user can record, for example, music data recorded in a number of CDs purchased by himself/herself to an HDD.

When the user reproduces the music data of a certain CD from the music data of CDs recorded in the HDD, in some cases, the number or title of the CD is selected by a controller provided for the apparatus or the like. A technique is disclosed in non-patent document 1 in which an RFID (Radio Frequency Identification) tag is attached to a CD, and an apparatus reads the RFID tag attached to the CD and retrieves the corresponding CD.

Non-patent document 1: Koji Tsukada and Toshiyuki Masui, "MouseField: Augmentation of Daily Commodities using the "Put and Move" Idiom", Interaction 2004 Papers, pp. 45-46 (2004), http://mobiguitous.com/activity.html

DISCLOSURE OF THE INVENTION

Problems to be Solved by the Invention

The method, however, has troublesomeness such that the user himself/herself has to obtain an RFID tag for his/her CD and attach the RFID tag to the CD.

Since the RFID tag is only an access key for reproducing corresponding content, in the case such that the RFID tag is lost or the CD itself to which an IC tag is attached is lost, a problem occurs such that there is nothing to do for the loss.

The present invention has been achieved in consideration of the circumstances and an object of the invention is to retrieve and process content to be processed by a simple method at the time of storing content recorded in a CD into an HDD or the like, reading desired content out of the content stored in the HDD from the HDD, and performing a process such as reproduction and recording on the read content.

Means for Solving the Problems

In order to solve the above problems, in one aspect of the present application, the invention according to claim 1 relates to a processor comprising:

storing means for storing at least one piece of information so as to be associated with related-image information of an image related to the information;

target image information obtaining means for obtaining target image information by capturing an image of an object related to the information to be processed;

information obtaining means for collating the obtained image information to be processed with the related-image information stored in the storing means and obtaining the information corresponding to the target image information from the storing means; and information processing means for processing the obtained information.

In order to solve the above problems, in one aspect of the present application, the invention according to claim 12 relates to a processing program for making a computer function as:

storing means for storing at least one piece of information so as to be associated with related-image information of an image related to the information;

target image information obtaining means for obtaining target image information by capturing an image of an object related to the information to be processed;

information obtaining means for collating the obtained image information to be processed with the related-image information stored in the storing means and obtaining the information corresponding to the target image information from the storing means; and information processing means for processing the obtained information.

BRIEF DESCRIPTION OF THE DRAWINGS

FIG. 8 is an explanatory diagram of rectangular region information L(t) obtained in the target medium image data obtaining process.

DESCRIPTION OF REFERENCE NUMERALS

Figure 1:
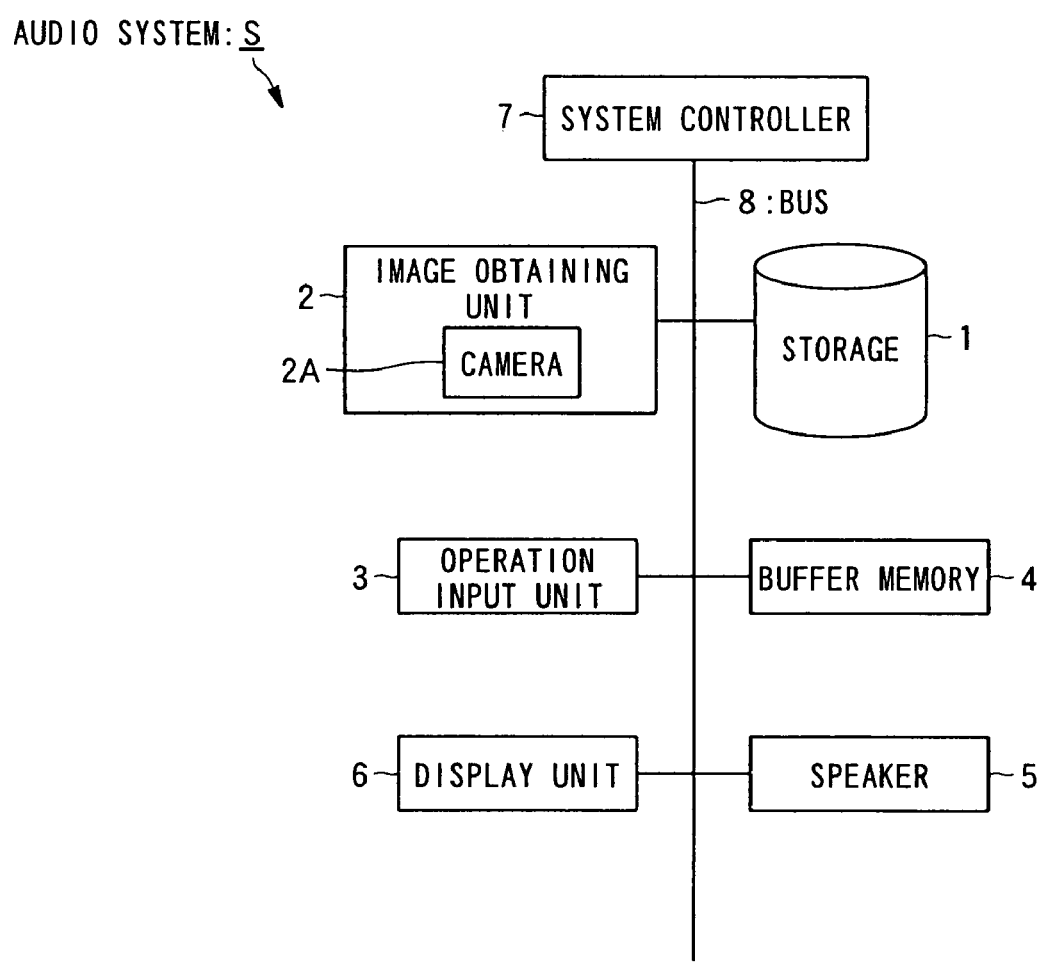
FIG. 1 is a block diagram showing the configuration of an audio system S.

S Audio system
1 Storage
2 Image obtaining unit
2A Camera
3 Operation input unit
3A Shutter button
3B Image recognition/reproduction start button
4 Buffer memory
5 Speaker
6 Display unit 7 System controller
8 Bus
C (C1, C2, ..., Cn) Content
Dj (Dj1, Dj2, ..., Djn) Jacket image data
DB Background image data
DF Error
DF2 Binary image data
DC RECTANGULAR REGION image data
Dimage Object image data
L RECTANGULAR REGION information
$L_m$ Average rectangular region information
Mh Standard binarization mask
M Mask
DCS Target medium image data
i, t Sampling time
F Command information
LD Motion vector
$LD_m$ Average motion vector
LD Motion vector
$LD_m$ Average motion vector
LDm' Normalized average motion vector
LTL, LTR Two vertex coordinates
LU Midpoint coordinates
θ Angle

BEST MODE FOR CARRYING OUT THE INVENTION

A. First Embodiment

Best modes of the present invention will be described hereinbelow with reference to the drawings. The following embodiments relate to the cases where a processor and an information recording/reproducing apparatus of the present invention are applied to an audio system.

[1. Embodiment of Configuration and Function of Audio System]

First, the configuration and function of an audio system according to the present embodiment will be described with reference to FIGS. 1 to 3. FIG. 1 is a block diagram showing a schematic configuration of an audio system S in the application.

The audio system S is, for example, an audio visual (hereinbelow, simply called AV) apparatus (for example, CD (Compact Disc) Player, a DVD (Digital Versatile Disc) player, a set top box, or the like). Sound and video image subjected to reproducing process in the audio system S is output from a speaker 5 for outputting sound and a display unit 6 such as a monitor or display for reproducing a video image.

The audio system S includes a storage 1 storing a file to which music data or the like recorded on a CD, DVD, or the like is ripped, a video image file with sound captured by a home digital video camera, or the like, and so on, an image obtaining unit 2 having a camera 2A, an operation input unit 3 used by the user for making settings and used at the time of entering an instruction of the audio system S, the display unit 6 for displaying image information or the like obtained by the image obtaining unit 2 by using a buffer memory 4, the speaker 5 for reproducing and outputting music information of content stored in the storage 1 by using the buffer memory 4, and a system controller 7 for controlling the whole system S. The components are connected to each other via a bus 8.

The storage 1 is a known storage such as an HDD (Hard Disc Drive), a magnetic disk drive, or a magnet-optical disc drive for storing various data, tables, and programs. The storage 1 stores (rips) music data (content C) recorded on a CD or the like in the format of WMA (Windows (registered trademark) Media Audio), MP3 (MPEG (Moving Picture Experts Group) Audio Layer-3), WAV, AVI, or the like.

The storage 1 also functions as storing means of the present invention in cooperation with the system controller 7, and stores the content C (information) so as to be associated with jacket image data Dj (related image information) indicative of an image (image related to information) of a jacket of a CD (information recording medium) on which the content C is recorded.

The content C and the jacket image data Dj stored in the storage 1 will be described.

Figure 2:
FIG. 2 is a diagram illustrating a content correspondence table stored in a storage 1.

FIG. 2 is an explanatory diagram of a content correspondence table stored in the storage 1. As shown in the diagram, in the embodiment, the content C (C1, C2, ..., Cn) recorded in "n" pieces of CDs is stored so as to be associated with the jacket image data Dj (Dj1, Dj2, ..., Djn) indicative of the jacket image of a CD. In the embodiment, the case where one CD is usually sold as a single disc will be described. In the case of applying the present invention to a so-called double CD or the like which is sold in two CDs, it is sufficient to store content C recorded in two discs so as to associate with one piece of the jacket image data Dj indicative of the image of the jacket of the CD.

In the embodiment, the jacket of a CD is described as an example of package of an information recording medium in the present invention.

The storage 1 also stores a standard binarization mask Mh used in an image recognizing/reproducing process which will be described in detail later. The standard binarization mask Mh has a rectangular shape (shape information) corresponding to the CD jacket.

The image obtaining unit 2 takes an image captured by the camera 2A as image data into the system S. At the time of generating a content correspondence table stored in the storage 1, the jacket image of the CD after the ripping (or before the ripping) is captured by the camera 2A, thereby obtaining the jacket image data Dj. The obtained jacket image data Dj is stored in association with the content C recorded in the CD into the storage 1.

When the operation input unit 3 is operated by the user to instruct start of an image recognizing/reproducing process which will be described in detail later, an image capture range of the camera 2A is captured, thereby obtaining background image data DB as background image information. The jacket of the CD recording the content C the user desires to reproduce, displayed in the image capture range of the camera 2A is captured, object image data Dimage as object image information is fetched in the system S, and the image recognizing/reproducing process is performed.

The operation input unit 3 is used when the user makes settings and gives various instructions to the audio system S. FIG. 3 shows a configuration example of the operation input unit 3. More concretely, after (or before) storing (ripping) the content C recorded in the CD into the storage 1, the user brings the CD jacket close to the camera 2A, and a shutter button 3A provided for the operation input unit 3 is depressed to perform image capturing. The captured image of the CD jacket is obtained as the jacket image data Dj, and stored in association with the content C in the storage 1 (refer to FIG. 2).

In the case where reproduction of the content C stored in the storage 1 is desired, the user depresses an image recognition/reproduction start button 3B provided for the operation input unit 3, thereby starting the image recognizing/reproducing process which will be described in detail later. In this case, the image capturing is sequentially performed, and the image recognizing/reproducing process is properly executed without operating the shutter button 3A.

Figure 3:
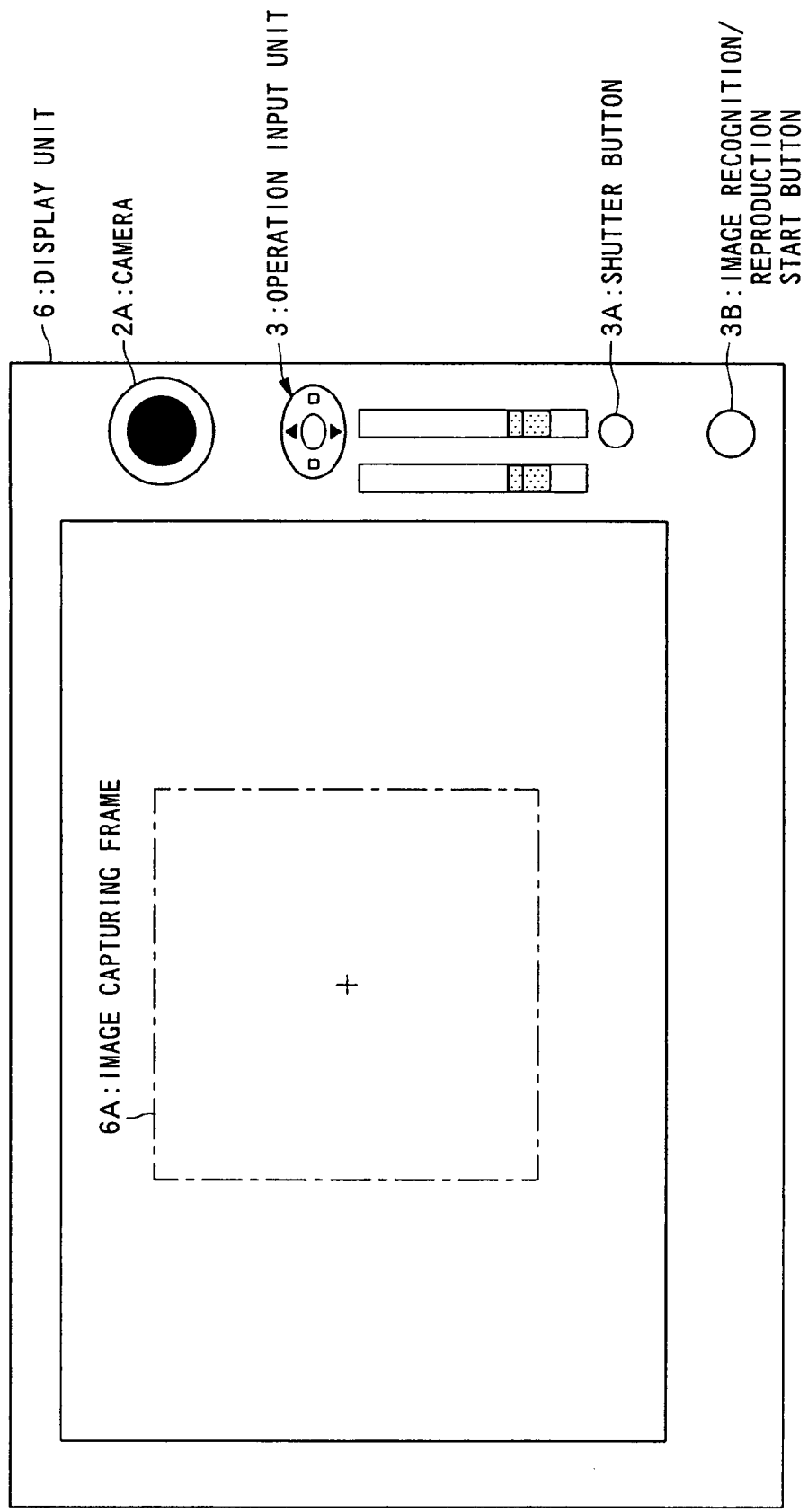
FIG. 3 shows a configuration example of an operation input unit 3.

In the embodiment, the example in which the operation input unit 3 is formed integrally with the camera 2A and the display unit 6 as shown in FIG. 3 has been described. The invention, however, is not limited to the example. The audio system S may be formed separately from the components and may transmit/receive various instruction signals and various data by short-range wireless communication such as Bluetooth. The audio system S may transmit/receive various data by connecting the components by a communication I/F of the IEEE (the Institute of Electrical and Electronic Engineers) 1394 or the like.

The speaker 5 generates a sound signal to be output from a not-shown sound processor in response to an instruction of the controller 7 on the basis of the content C obtained from the storage 1 under control of the system controller 7, and an amplified signal is output via the speaker 5.

The display unit 6 is constructed by a monitor or the like for performing displaying process on the basis of predetermined process so as to display image data obtained by the image obtaining unit 2 onto the display unit 6 by a not-shown display processor in accordance with the instruction of the controller 10, reads the image data subjected to the displaying process from the buffer memory 4 at a predetermined timing while temporarily storing the image data in the buffer memory 4, and displays an image. For example, after (or before) storing (ripping) the content C recorded in a CD into the storage 1, when the user brings the CD jacket close to the camera 2A, and the shutter button provided for the operation input unit 3 is depressed to perform image capturing, an image capturing frame 6A is displayed in the display unit 6 as shown by an alternate long and short dash line in FIG. 3. Consequently, the user can operate the shutter button 3A provided for the operation input unit 3 so as to make the image of the CD jacket being captured by the camera 2A match the image capturing frame 6A displayed on the display unit 6 while displaying and recognizing the image on the display unit 6. Therefore, the clear jacket image data Dj always having the same size can be obtained.

Also in the case where reproduction of the content C stored in the storage 1 is desired, the user brings a CD jacket desired to be reproduced close to the camera 2A, and the image recognizing/reproducing process is performed, the user displays the image of the CD jacket being captured by the camera 2A on the display unit 6. While recognizing the image, the user is guided to a place where the CD jacket is held so that the image is fit in the image capturing frame 6A displayed on the display unit 6. It enables more reliable image recognition to be performed in the image recognizing/reproducing process described in detail later.

The system controller 7 includes a not-shown CPU (Central Processing Unit), a work RAM (Random Access Memory), a ROM (Read Only Memory) for storing various control programs including a process program, data, and the like, and an oscillator circuit. Based on an operation signal from a not-shown operating unit, the system controller 7 generates control information for controlling the components so as to realize an operation corresponding to operation information included in the operation signal, and outputs the control information to the corresponding component via the bus 8, thereby controlling the operation of the component in a centralized manner. More concretely, the system controller 7 includes various input/output ports such as a key input port and a control port of a display unit M, and controls general functions for processing in a centralized manner. By executing programs stored in the ROM or the like, the system controller 7 functions as storing means, target image information obtaining means, information obtaining means, information processing means, background image information obtaining means, object image information obtaining means, differential image information obtaining means, region extracting means, and the like.

More concretely, the system controller 7 functions as storing means in cooperation with the storage 1, and stores content C stored in a CD and the jacket image data Dj showing the jacket image of the CD that records the content C.

The system controller 7 functions as background image information obtaining means and object image information obtaining means together with the image obtaining unit 2. When the operation input unit 3 is operated by the user, the system controller 7 captures an image in the image capturing range of the camera 2A and obtains the background image data DB as background image information in the image recognizing/reproducing process which will be described in detail later. The jacket of the CD recording the content C desired to be reproduced, which is displayed in the image capturing range in the camera 2A by the user is captured, thereby obtaining the object image data Dimage as object image information.

The system controller 7 also functions as differential image information obtaining means and region extracting means. On the basis of pixel values constructing the background image data DB and the object image data Dimage obtained in the image recognizing/reproducing process which will be described in detail later, the system controller 7 obtains an error DF as differential image information between the background image data DB and the object image data Dimage, and extracts a region corresponding to the rectangular shape shown in the standard binarization mask Mh stored in the storage 1, from binary image data DF2 obtained by binarizing the error DF, thereby obtaining rectangular-region image data DC.

The system controller 7 also functions as target image information obtaining means, and obtains target medium image data DCS as target image information by performing resolution converting process so that the rectangular region image data DC has the same size as that of the jacket image data Dj stored in the storage 1.

The system controller 7 also functions as information obtaining means and information processing means. The system controller 7 collates the target medium image data DCS obtained in the image recognizing/reproducing process which will be described in detail later with the jacket image data Dj stored in the storage 1 by the image recognizing/reproducing process which will be described in detail later, obtains the corresponding content C from the storage 1, and performs predetermined reproducing process.

[2. Image Recognizing/Reproducing Process]

The image recognizing/reproducing process of the audio system S will now be described with reference to FIGS. 4 to 6.

Figure 4:
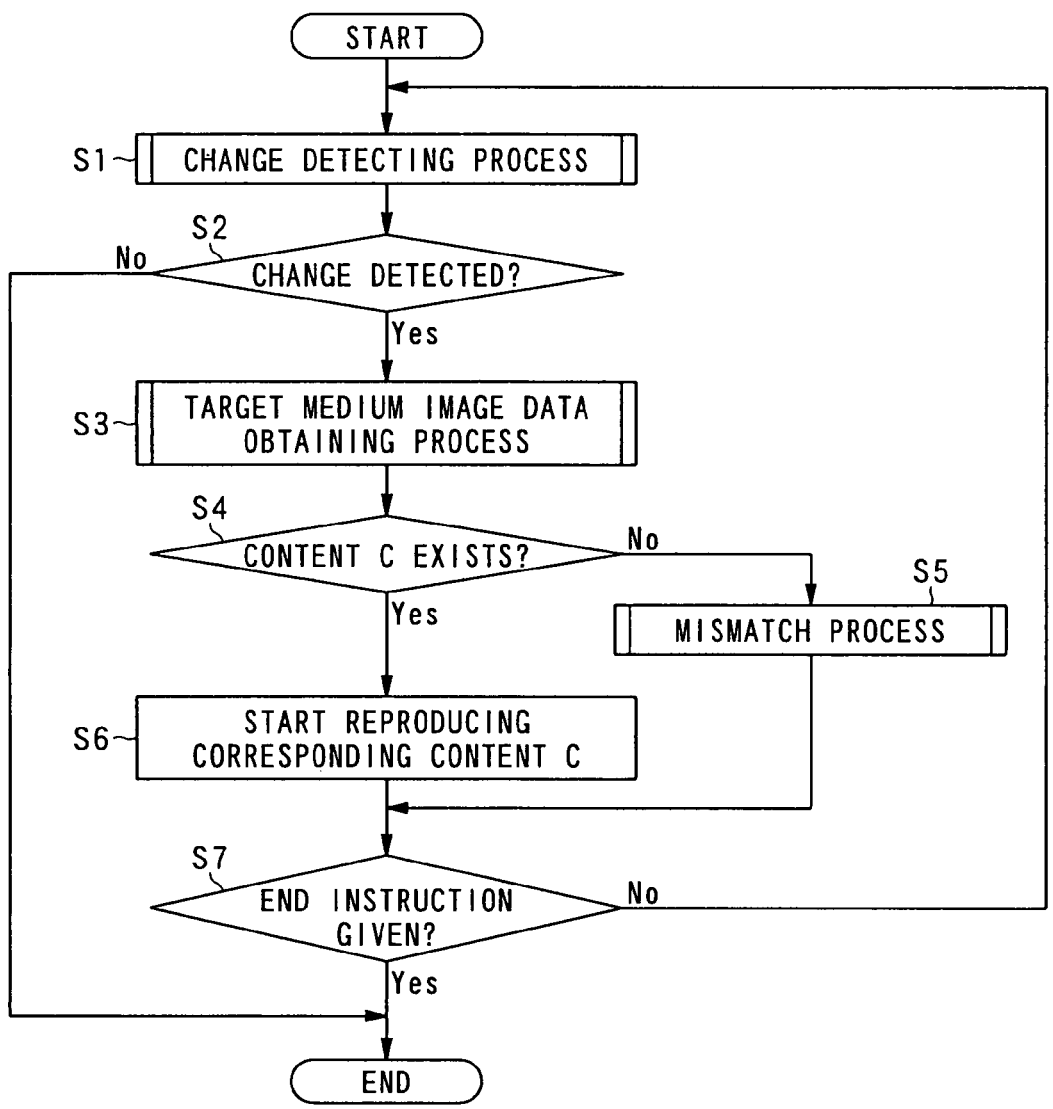
FIG. 4 is a flowchart showing image recognizing/reproducing process executed by a system controller 7 in a first embodiment.
Figure 5:
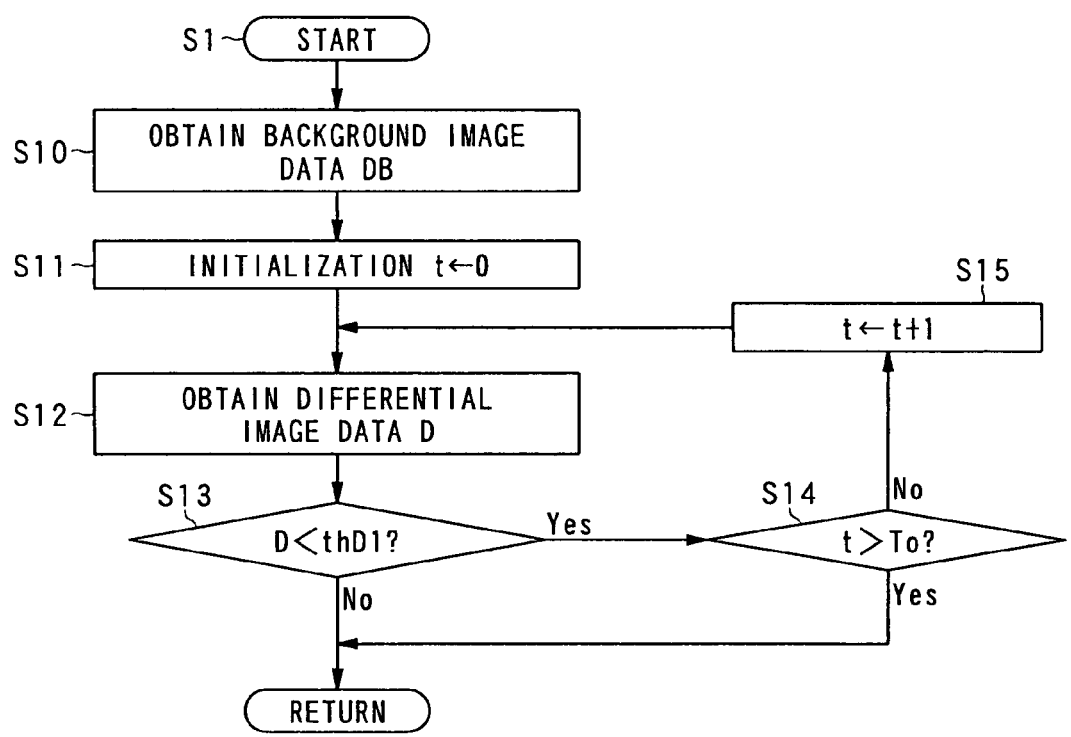
FIG. 5 is a flowchart showing change detecting process executed by the system controller 7 in the first and second embodiments.
Figure 6:
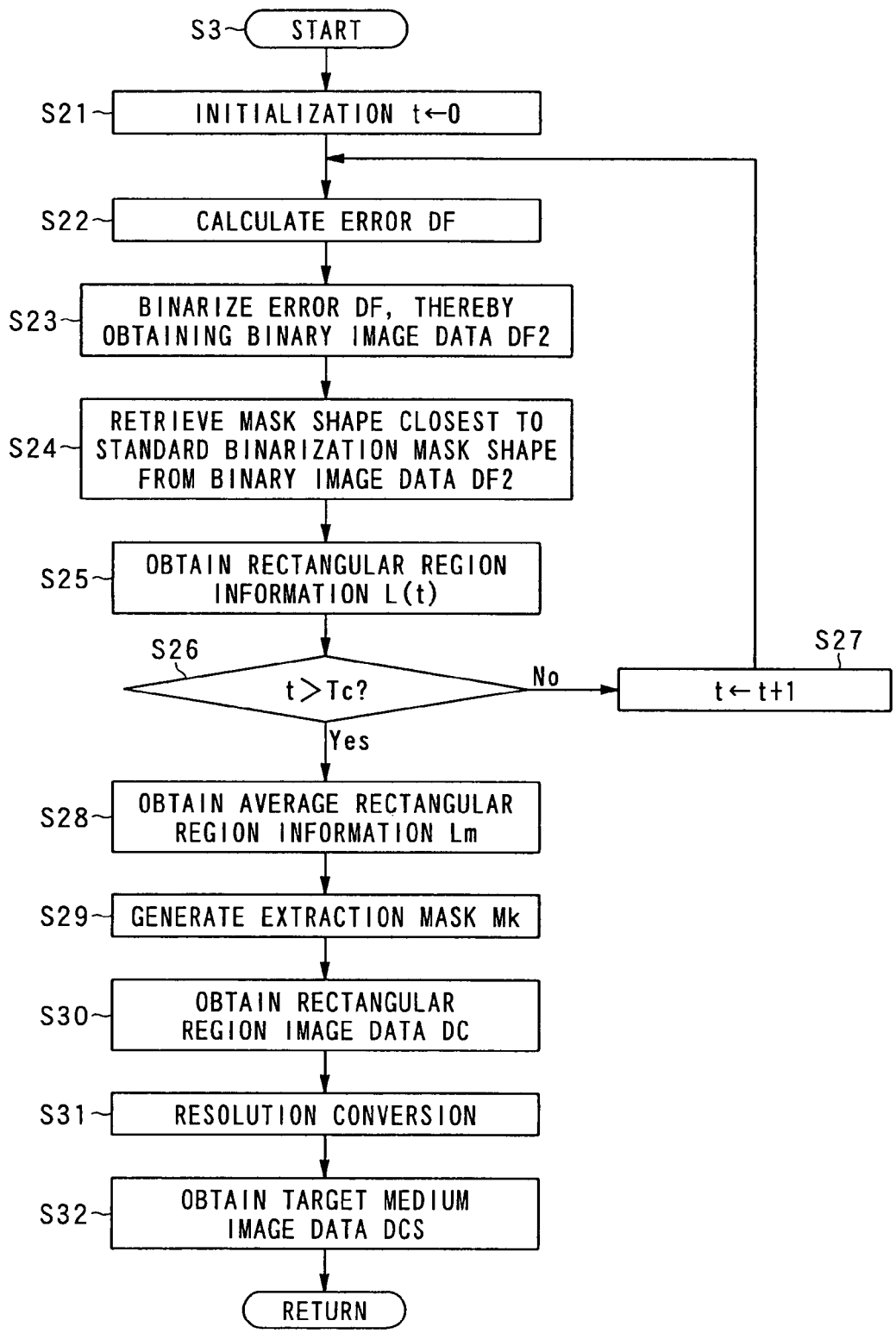
FIG. 6 is a flowchart showing target medium image data obtaining process executed by the system controller 7 in the first and second embodiments.

FIGS. 4 to 6 are flowcharts showing the image recognizing/reproducing process performed in the system controller 7 in the audio system S. The process shown in the flowcharts is executed under control of the system controller 7 on the basis of a program pre-stored in the not-shown ROM or the like in the system controller 7.

When the user instructs to start the image recognizing/reproducing process by depressing the image recognition/reproduction start button 3B provided for the operation input unit 3, the image recognizing/reproducing process starts.

First, the operation of the image recognizing/reproducing process will be roughly described with reference to FIG. 4. After that, each of a change detecting process and a target medium image data obtaining process executed in the image recognizing/reproducing process will be concretely described by using the flowcharts of FIGS. 5 and 6, respectively.

When an instruction to start the image recognizing/reproducing process is given by depression of the image recognition/reproduction start button 3B of the user, the change detecting process is performed (step S1). Whether or not a change is detected in the change detecting process which will be described in detail later is determined (step S2). In the case where a change is detected (Yes in step S2), subsequently, the target medium image data obtaining process is performed (step S3).

Specifically, in the change detecting process in step S1, by capturing an image of the image capturing range in the camera 2A by the camera 2A, entry of any object into the image capturing range in the camera 2A is detected. In such a manner, it is detected that the user brings a CD jacket desired to be reproduced close to the camera 2A.

In the target medium image data obtaining process in step S3, image capturing is performed by the camera 2A within specified sampling time Tc. On the basis of image data fetched in the system by the image obtaining unit 2, a rectangular region corresponding to the CD jacket showed in front of (the image capturing range) of the camera 2A by the user is extracted, and the target medium image data DCS is obtained on the basis of a predetermined process which will be described in detail later.

On the other hand, in the case where it is determined in step S2 that no change is detected (No in step S2), the process is finished. In this case, predetermined sound such as "No image is captured. Please do it again from the beginning." may be reproduced and output from the speaker 5 to urge the user to re-attempt the image recognizing/reproducing process by operating the image recognition/reproduction start button 3B.

Subsequently, with reference to the content correspondence table stored in the storage 1, the target medium image data DCS obtained in the process of step S3 is collated with the jacket image data Dj to retrieve the corresponding content C (step S4).

More concretely, by computing correlation between the target medium image data DCS and the jacket image data Dj, the jacket image data Dj having the highest correlation is obtained from all of the jacket image data Dj stored in the storage 1, and the content C corresponding to the jacket image data Dj is retrieved. In a photograph of a jacket of a CD or the like, the identity of an artist is reflected, and the photograph has high independence. Therefore, as a result of the correlation computation, the jacket image data Di having the highest correlation among all of the jacket image data Dj stored in the storage 1 is largely displayed and reproduced as an icon on the display unit 6.

High-order jacket image data Di candidates may be also displayed as icons having sizes proportional to their correlation values on the display unit 6 like the jacket image data Di having the second highest correlation, the jacket image data Di having the third highest correlation, . . . . The icons can be selected by an operation on the operating input unit 3 of the user or by forming the display unit 6 as a touch panel. With the configuration, the user can re-select content desired to be reproduced. Therefore, even if an error occurs in the correlation computation result, the user can change the content C to be reproduced by selecting the next candidate, the third candidate, or the like while seeing the icons displayed on the display unit 6.

In the case where the corresponding content C is not stored as a result of retrieval (No in step S4), predetermined sound such as "no matched content" is reproduced and output from the speaker 5, and a predetermined mismatch process is performed under control of the system controller 7 such as process of displaying a predetermined standby screen on the display unit 6 (step S5), and the program shifts to step S7.

On the other hand, when corresponding content C is stored as a result of retrieval in step S4 (Yes in step S4), the content C is obtained from the storage 1 and reproducing process starts (step S6).

Whether or not end of the image recognizing/reproducing process is instructed after the mismatch process is performed in step S5 or when the process of reproducing the corresponding content C starts in step S6 is determined (step S7). When end of the image recognizing/reproducing process is instructed (Yes in step S7), the image recognizing/reproducing process is finished. On the other hand, when end of the image recognizing/reproducing process is not instructed (No in step S7), the program returns to step S1 and the image recognizing/reproducing process is performed.

As an example of the instruction of end in step S7, the user operates the operation input unit 3 to generate an instruction signal for finishing the image recognizing/reproducing process, and the process is finished under control of the system controller 7.

[2-1. Change Detecting Process]

The change detecting process in step S1 will be concretely described by using the flowchart of FIG. 5.

First, to obtain image data when a CD jacket is not displayed yet, the background image data DB is obtained (step S10). The background image data DB is expressed by the following equation 1 where "t" denotes sampling time measured on the basis of a clock internally provided for the system controller 7, (x,y) denotes space coordinates, and image(x,y,t) indicates a pixel value such as gray level in the space coordinates (x,y) at the sampling time "t" or a brightness value.

[Equation 1]

$$DB(x, y) = \frac{1}{T} \sum_{t=1}^{T} \text{image}(x, y, t) \quad \text{(EQ. 1)}$$

Therefore, "DB(x,y)" calculated by the equation 1 denotes an average value of pixel values in the range from image data at the sampling time t=1 to image data at t=T captured by the camera 2A. The system controller 7 deals image data expressed by the average value "DB(x,y)" of the pixel values as the background image data DB. The background image data DB obtained in such a manner is stored in the RAM or the like in the system controller 7.

Subsequently, initialization is performed by setting the sampling time "t" to 0 (step S11) image data is monitored, and image data indicative of the present image is obtained. The background image data DB(x,y) obtained in step S1 is substituted for the following equation, thereby obtaining differential image data D(x,y,t) (step S12).

[Equation 2]

$$D(x, y, t) = \sum_{x,y} |Dimage(x, y, t) - DB(x, y)| \quad \text{(EQ. 2)}$$

"Dimage(x,y,t)" in the right side in the equation 2 denotes image data indicative of the present image. That is, the Dimage(x,y,t) shows the object image data Dimage obtained by capturing the CD jacket that records the content C desired to be reproduced and displayed in the image capturing range in the camera 2A by the user.

Generally, when the present image is not changed as compared with the background image, "Dimage(x,y,t)" and "DB (x,y)" have almost equal values and the value of D(x,y,t) becomes small. On the other hand, when a change occurs in the present image such that a CD jacket is brought in front of (image capturing range) of the camera 2A, the difference between "Dimage(x,y,t)" and "DB(x,y,t)" increases, and the value of "D(x,y,t)" increases. Therefore, "D(x,y,t)" indicative of the differential image data D is used as an index of determining whether any object is displayed in the image capturing range of the camera 2A or not. When the value exceeds a predetermined value, it is estimated that a CD jacket is displayed in front of (image capturing range) of the camera 2A.

In the process of step S13, the system controller 7 compares "D(x,y,t)" indicative of the calculated differential image data D with a predetermined threshold "thD1". When "D(x,y,t)" indicative of the differential image data D is equal to or larger than the threshold "thD1" (No in step 13), it is determined that a CD jacket is displayed in the image capturing range of the camera 2A.

Therefore, in the process of step S13, when "D(x,y,t)" indicative of the differential image data D is less than the threshold "thD1" (Yes in step 13), the change detecting process is finished, and the program returns to the process shown in FIG. 4. In this case, in the process in step S2 shown in FIG. 4, it is determined that a change is detected (Yes in step S2).

On the other hand, in the process of step S13, when "D(x,y,t)" indicative of the differential image data D is equal to or larger than the threshold "thD1" (No in step 13), whether the sampling time "t" has elapsed predetermined timeout time To (for example, 30 seconds to 1 minute) or not is determined (step S14). When the sampling time "t" has not elapsed the timeout time To (No in step S14), the sampling time "t" is changed to "t+1" (step S15). The program shifts to the process of step S12 and the differential image data D is obtained again. Until the timeout time To elapses or the differential image data D which is equal to or larger than the threshold thD1 is obtained, the processes in steps S12 and S13 are repeated.

[2-2. Target Medium Image Data Obtaining Process]

Subsequently, the target medium image data obtaining process in step S3 will be concretely described by using the flowchart of FIG. 6.

First, initialization is performed by setting the sampling time "t" to 0 (step S21).

Next, an image is obtained by the image obtaining means 2. The obtained image is used as image data indicative of a present image, and an error DF(x,y,t) between the obtained image and the background image data DB is calculated by the following equation 3 (step S22).

[Equation 3]

$$DF(x,y,t) = |D\text{image}(x,y,t) - DB(x,y)| \quad \text{(EQ. 3)}$$

The error DF(x,y,t) (hereinbelow, referred to as "error DF") is calculated by subtracting the pixel values of pixels constructing the background image data DB obtained in step S10 and indicated as the background image data DB(x,y) from corresponding pixels constructing the object image data Dimage indicative of the present image expressed by Dimage (x,y,t).

Subsequently, the calculated error DF is binarized, thereby obtaining binary image data DF2(x,y,t) (hereinbelow, referred to as "binary image data DF2") (step S23).

More concretely, a part in which the error "DF(x,y,t)" is larger than the predetermined threshold "thD2" is set as "1", and a part in which the error "DF(x,y,t)" is equal to or less than the predetermined threshold "thD2" is set as "0", thereby obtaining the binary image data DF2(x,y,t). In other words, in a part in which the image of the CD jacket is displayed, the error "DF(x,y,t)" between the object image data Dimage and the background image data DB is large. Therefore, the binary image data DF2 is formed while including a rectangular-shaped mask indicative of the part corresponding to a CD jacket (the shape of a CD jacket).

Subsequently, a binarization mask shape closest to the shape of the standard binarization mask Mh indicative of a rectangular shape corresponding to a CD jacket is retrieved from the obtained binary image data DF2 (step S24).

Figure 7B:
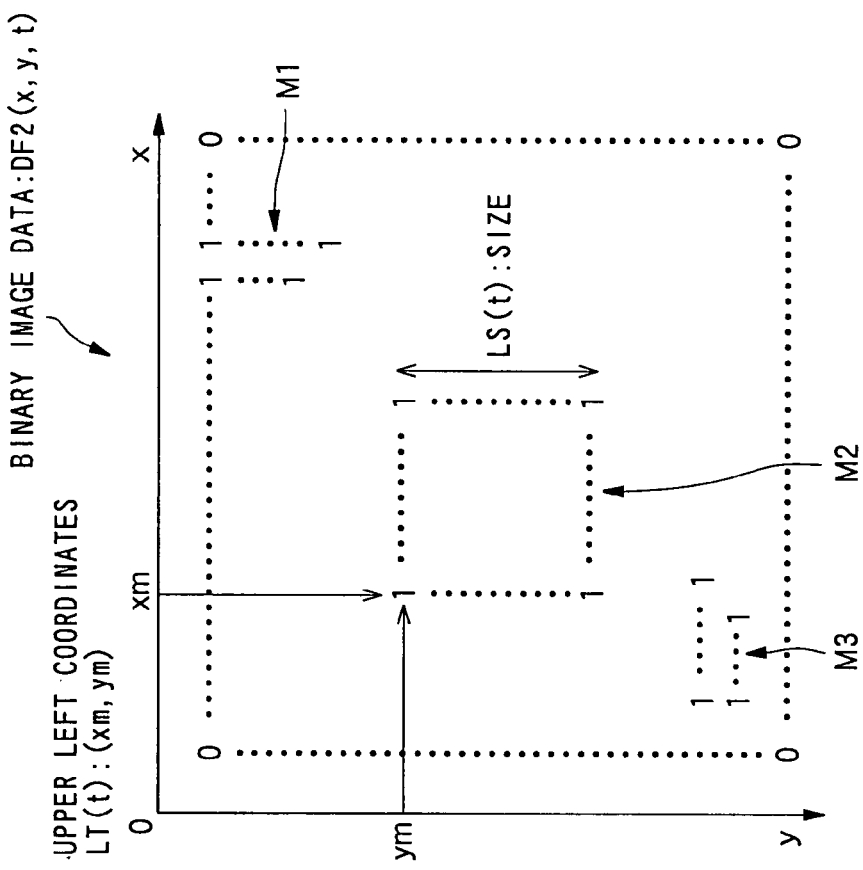
FIG. 7B is an explanatory diagram of binary image data DF2.
Figure 7A:
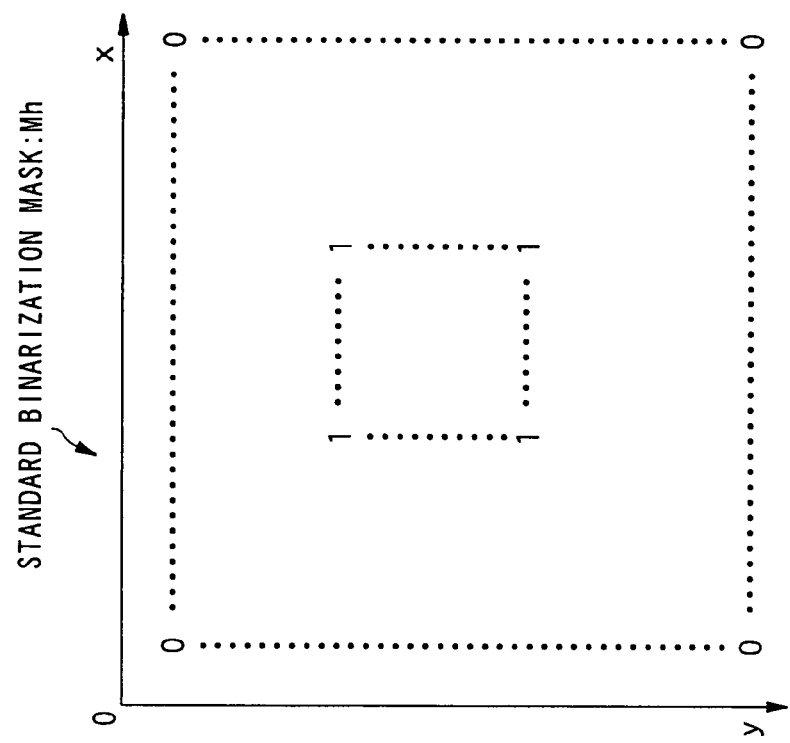
FIG. 7A is an explanatory diagram of a standard binarization mask Mh.

FIG. 7A is an explanatory diagram of the standard binarization mask Mh, and FIG. 7B is an explanatory diagram of the binary image data DF2 obtained in step S23.

The shape of the standard binarization mask Mh shown in FIG. 7A is the same as the rectangular shape of a CD jacket. As the binary image data DF2 obtained in step S23, mask shapes in some places due to the movement of a hand holding a CD jacket in front of the camera 2A and the like are obtained as shown in FIG. 7B. In the example of the binary image data DF2 shown in FIG. 7B, the binary image data DF2 includes masks M1, M2, and M3. Among the masks M1, M2, and M3, the mask M2 is retrieved as a mask shape closest to the standard binarization mask Mh shown in FIG. 7A.

Subsequently, the size LS(t) of the mask shape retrieved in step S24 and the upper left coordinates LT(t) (LT(t)=(xm, ym)) are obtained as the rectangular region information L(t) (step S25). The obtained rectangular region information L(t) is temporarily stored in the RAM or the like in the system controller 7 as shown in FIG. 8.

Whether the sampling time "t" has lapsed predetermined sampling time Tc (for example, 1 to 2 seconds) or not is determined (step S26). When it has not lapsed the predetermined sampling time Tc (No in step S26), the sampling time "t" is changed to "t+1" (step S27), and the program shifts to the process of step S22. The image data is monitored again, and image data corresponding to the image data of the present image is obtained. By repeating the processes in steps S22 to S25, the rectangular region information shown in FIG. 8 is sequentially obtained. The specific sampling time Tc can be properly changed on the basis of the control performance of the system controller 7, the image obtaining unit, and the like.

On the other hand, in the case where it is determined in the process of step S26 that the sampling time "t" has lapsed the predetermined sampling time Tc (Yes in step S26), the rectangular region information L(t) obtained in step S25 is read from the RAM or the like in the system controller 7 and is averaged on the basis of the following equation 4, thereby obtaining average rectangular region information $L_m$ ($LS_m$ and $LT_m$) (step S28).

[Equation 4]

$$L_m \begin{cases} LS_m = \text{round}\left(\dfrac{1}{Tc}\sum_{t=0}^{Tc-1} LS(t)\right) \\ LT_m = \text{round}\left(\dfrac{1}{Tc}\sum_{t=0}^{Tc-1} LT(t)\right) \end{cases} \quad \text{(EQ. 4)}$$

An extraction mask Mk(x,y) (hereinbelow, referred to as "extraction mask Mk") in which the region in a rectangular shape indicated by the average rectangular region information $L_m$ obtained in step S28 is set to "1" and the other region is set to "0" is generated.

By using the generated extraction mask Mk, rectangular region image data DC(x,y) (hereinbelow, referred to as "rectangular region image data DC") is extracted and obtained (step S30).

[Equation 5]

$$DC(x,y)=M(x+LT_m,y+LT_m)\cdot image(x+LT_m,y+LT_m) \quad (EQ. 5)$$

Resolution conversion is performed so that the size of the obtained rectangular region image data DC becomes the same as that of the jacket image data Dj stored in the storage 1 (step S31). The target medium image data DCS is obtained (step S32) and stored in the RAM or the like in the system controller 7. After that, the program shifts (returns) to the process in step S4 in the flowchart of FIG. 4, and the target medium image data obtaining process is finished.

In the processes of steps S4 to S6 shown in the flowchart of FIG. 4, the target medium image data DCS stored in the RAM or the like is read on the basis of the process of the system controller 7. With reference to the content correspondence table stored in the storage 1, the target medium image data DCS and the jacket image data Dj are collated with each other, thereby retrieving the corresponding content C, and the reproducing process is performed.

In the foregoing first embodiment, with the binary image data DF2 obtained by binarizing the error DF between the jacket image (object image data Dimage) of a CD captured by the camera 2A and the background image data DB, on the basis of the standard binarization mask Mh indicative of the rectangular shape of the jacket of a CD, the image of the CD jacket is discriminated from the other images. In such a manner, the target medium image data DCS obtained by extracting only the image region of the CD jacket can be obtained. The obtained target image medium data DCS is collated with the jacket image data Dj stored in the storage 1, thereby obtaining the corresponding content C. The obtained content C can be reproduced.

In the foregoing embodiment, the content C recorded in the CD is associated with the jacket image data Dj as the image of the jacket of the CD as an access key. Consequently, for example, even when an image of the jacket of a CD borrowed from a friend is captured as an object related to the content C by the camera 2A to obtain the object image data Dimage, almost the same object image data Dimage and the target medium image data DCS can be obtained. Thus, the same content C can be obtained.

In the foregoing embodiment, resolution conversion is performed so that the size of the rectangular region image data DC obtained in step S31 becomes the same as that of the jacket image data Dj stored in the storage 1, thereby obtaining the target medium image data DCS. Consequently, the target medium image data DCS having almost the same size can be obtained also from a copy of a CD jacket having a size different from an actual CD jacket or a printed matter of a CD jacket such as a clipping of a photo of a CD (the jacket of the CD) from a magazine. Thus, accesses to single piece of content C can be varied.

Further, an image of the jacket of a CD is expression of the identity of the artist of the CD. Therefore, by using the jacket image as an image related to the content C, an effect such that the independence as an access key is high is produced.

In the foregoing embodiment, an image of a CD jacket is used as an image related to content C. The invention, however, is not limited to the embodiment. For example, an image of the face (the face in which a design or the like is drawn) opposite to the recording face of a CD disc may be used as an image related to the content C. In this case, the user captures an image of the CD disc as an object related to the content C by the camera 2A, and an image of the face opposite to the recording face of the CD disc is obtained as the object image data Dimage. In this case, it is sufficient to obtain the target medium image data DCS by using the standard binarization mask Mh having the disc shape of a CD disk.

Further, in the foregoing embodiment, the content C recorded in a CD is ripped and stored into the storage 1. Alternatively, content C downloaded (or streamed) via a network such as the Internet may be stored in the storage 1. In this case, an image of a CD put on a download site, a photograph of an artist, or the like may be also downloaded as an image related to the content C and stored so as to be associated with the content C into the storage 1. The image of the CD put on the site or the photograph of the artist may be printed on a sheet of paper or the like, and a printed matter such as the printed sheet may be used as an object related to the content C. In addition, any information which can be captured by the camera 2A such as a note of an artist name and a title or a portrait can be used as an object (target image information) related to the content C. In this case, it is sufficient to store, as related image information, the note of the artist name and the title, a portrait, or the like in the storage 1 so as to be associated with the content C.

Further, the content C and attribute information (release date, artist name, producer name, record company, and the like) of the CD is stored in the storage 1 so as to be associated with each other. Alternatively, on recognition of a CD jacket or the like, the attribute information is retrieved via the Internet. With the configuration, when the artist of the CD is a band made by a plurality of members, the various content C of solo albums of the members and the like can be retrieved from the storage 1 with the attribute information as a key. Even in the case where solo albums of the members and the like are not stored in the storage 1, they can be downloaded via the Internet or the like.

As described above, a single CD jacket, a single photograph, a memo, or the like can be used as a key for accessing not only single content C associated in advance but also a plurality of pieces of content C.

B. Second Embodiment

A second embodiment as another embodiment of the invention will be described with reference to the drawings.

In the first embodiment, an image of a CD jacket captured by the camera 2A is recognized and, with the image as an access key, corresponding content C in the content C stored in the storage 1 is retrieved and reproduced. In the second embodiment, by executing a program stored in the ROM or the like, the system controller 7 is made function as motion detecting means.

Concretely, when the user moves a CD jacket in front of the camera 2A (in the image capturing range of the camera 2A) in order to execute a predetermined process (command) during reproduction of content C, various commands can be executed on the basis of image data of the CD jacket recognized/obtained during various reproduction operations as follows. The image of the CD jacket is recognized and a process of controlling the volume of the content C output and reproduced from the speaker 5 is performed. In the case where content C is made of a plurality of music pieces, a process of selecting a music piece is performed.

Since the other configuration and the function of the audio system S are similar to those of the first embodiment, the description will not be repeated.

1. Image Recognizing/Reproducing Process

Figure 9:
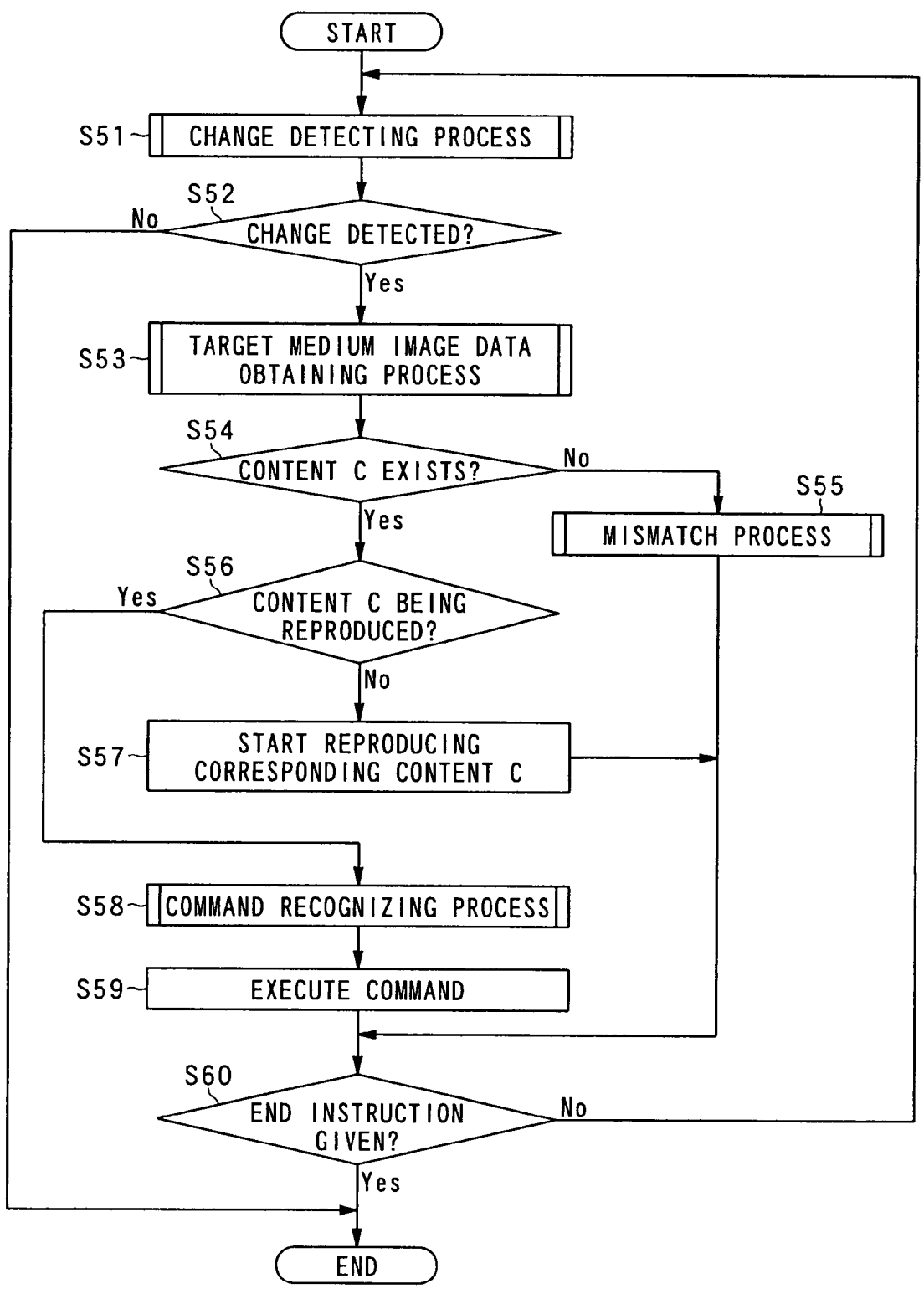
FIG. 9 is a flowchart showing image recognizing/reproducing process executed by the system controller 7 in the second embodiment.

FIG. 9 is a flowchart showing an image recognizing/reproducing process in the system controller 7 in the audio system S. The processes shown in the flowchart are executed under control of the system controller 7 on the basis of a program pre-stored in a not-shown ROM or the like in the system controller 7.

First, when the image recognition/reproduction start button 3B is depressed by the user during reproduction of the content C to instruct start of the image recognizing/reproducing process, the change detecting process is performed (step S51). Whether a change is detected or not is determined (step S52). When a change is detected (Yes in step S52), a target medium image data obtaining process is subsequently performed (step S53). On the other hand, when it is determined in step S52 that a change is not detected (No in step S52), the process is finished. Since the change detecting process in step S51 and the target medium image data obtaining process in step S53 are similar to those of the first embodiment, the description will not be repeated.

Subsequently, with reference to the content correspondence table stored in the storage 1, the target medium image data DCS obtained in the process of step S53 is collated with the jacket image data Dj to retrieve the corresponding content C (step S54). When there is no corresponding content C as a result of the retrieval (No in step S54), a predetermined mismatch process is performed under control of the system controller 7 such as a process of displaying a predetermined message such as "no matched content" on the display unit 6 (step S55), and the program shifts to step S60.

Since the processes in steps S51 to S55 are similar to those in steps S1 to S5 in the foregoing first embodiment, the detailed description will not be repeated. Although sound such as "no matched content" is output from the speaker 5 as the predetermined mismatch process in step S5, in the present embodiment, since the content C is being reproduced, a predetermined message is displayed on the display unit 6 so as not to interrupt the content C being reproduced. In the case where a target medium is not a CD but a DVD or the like, a predetermined message may be displayed in an upper or lower end part of the monitor of the display unit 6.

In the case where corresponding content C is stored as a result of the retrieval in step S54 (Yes in step S54), whether the content C is being currently reproduced or not is determined (step S56). When it is determined that the content is being currently reproduced (Yes in step S56), the program shifts to a command recognizing process in step S58. The command recognizing process (step S58) will be described in detail later by using a flowchart.

On the other hand, when it is determined in step S54 that the corresponding content C is not currently reproduced (No in step S56), the target medium image data DCS obtained in step S53 is collated with the jacket image data Dj. Corresponding content C is obtained from the storage 1 and reproducing process is started (step S57). After that, the program shifts to step S60.

When command information F is obtained in a command recognizing process in step S58, a predetermined command corresponding to the obtained command information F is executed (step S59), and the program shifts to step S60. The command information F and the command corresponding to the command information F will be described in detail later in the description of the command recognizing process.

In step S60, whether end of the image recognizing/reproducing process is instructed or not is determined like the process in step S7 in the first embodiment (step S60). When the end of the image recognizing/reproducing process is instructed (Yes in step S60), the image recognizing/reproducing process is finished. On the other hand, when end of the image recognizing/reproducing process is not instructed (No in step S60), the program returns to step S51, and the image recognizing/reproducing process is performed.

[2. Command Recognizing Process]

Figure 10:
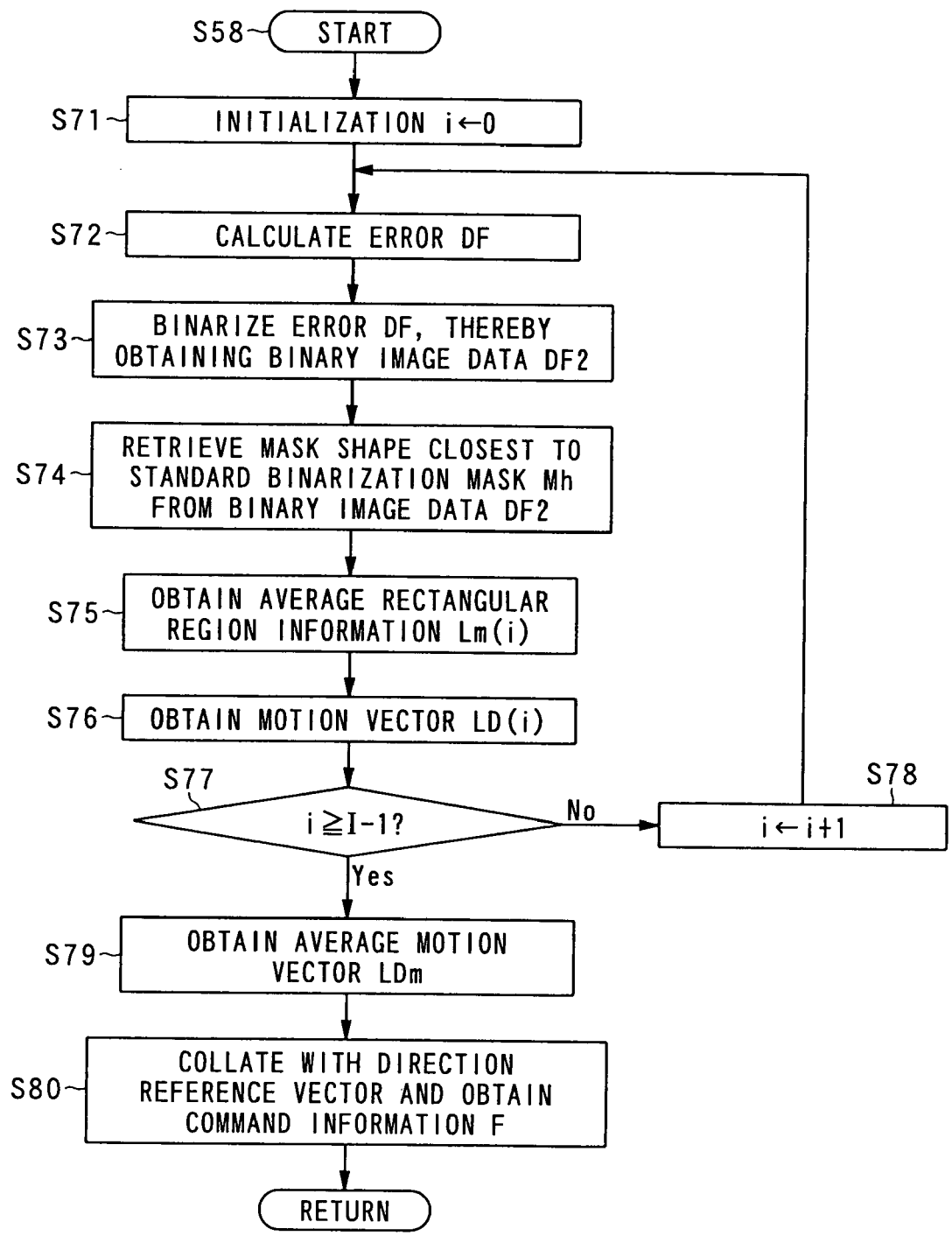
FIG. 10 is a flowchart showing command recognizing process executed by the system controller 7 in the second embodiment.

The command recognizing process in step S58 will be described concretely by using the flowchart of FIG. 10. The processes shown in the flowchart are executed under control of the system controller 7 on the basis of a program pre-stored in the not-shown ROM or the like in the system controller 7.

First, sampling time "i" is initialized to 0 (step S71)

Next, an image is obtained by the image obtaining means 2. The obtained image is used as image data indicative of a present image, and an error DF(x,y,t) between the obtained image and the background image data DB is calculated (step S72).

The calculated error DF(x,y,t) is binarized, thereby obtaining binary image data $DF2(x,y,t)$ (hereinbelow, referred to as "binary image data DF2") (step S73).

A binarization mask shape closest to the shape of the standard binarization mask Mh indicative of a rectangular shape corresponding to a CD jacket is retrieved from the obtained binary image data DF2 (step S74), and the upper left coordinates LT(i) (LT(i)=(x,y)) of the retrieved mask shape are obtained as the rectangular region information L(i). The process is repeated and the information is averaged on the basis of the equation 4 described in the first embodiment, thereby obtaining average rectangular region information $L_m$ (i) (step S75).

Since the processes shown in the steps S71 to S75 are similar to those in the steps S21 to S28 in the target medium image data obtaining process described in detail in the first embodiment, the detailed description will not be repeated.

Further, the average rectangular region information $L_m$ (i) obtained in step S75 is substituted for the following equation 6 to calculate and obtain a motion vector LD(i) at each of times (step S76).

[Equation 6]

$$LD(i)=L_m(i)-L_m(i-1) \quad \text{(EQ. 6)}$$

Whether the sampling time "i" has lapsed predetermined sampling time I or not is determined (step S77). When it has not lapsed the predetermined sampling time I (No in step S77), the sampling time "i" is changed to "i+1" (step S78), and the program shifts to the process of step S72. The image data is monitored again, and image data corresponding to the image data of the present image is obtained. By repeating the processes in steps S72 to S76, the motion vector LD(i) is sequentially obtained. The obtained motion vector LD(i) is temporarily stored in the RAM or the like in the system controller 7.

On the other hand, in the case where it is determined in the process of step S77 that the sampling time "i" has lapsed the predetermined sampling time I (Yes in step S77), the motion vector LD(i) obtained in step S76 is read from the RAM or the like in the system controller 7 and is averaged on the basis of the following equation 7, thereby obtaining average motion vector $LD_m$ (step S79)

[Equation 7]

$$LD_m = \frac{1}{I}\sum_{i=0}^{I-1} LD(i) \qquad (EQ. 7)$$

Consequently, the direction in which the user moves the CD jacket in the image capturing range of the camera 2A can be grasped.

The obtained average motion vector $LD_m$ and a predetermined direction reference vector are collated with each other, thereby obtaining command information F corresponding to a matched direction reference vector (step S80).

Figures 11A, 11B:
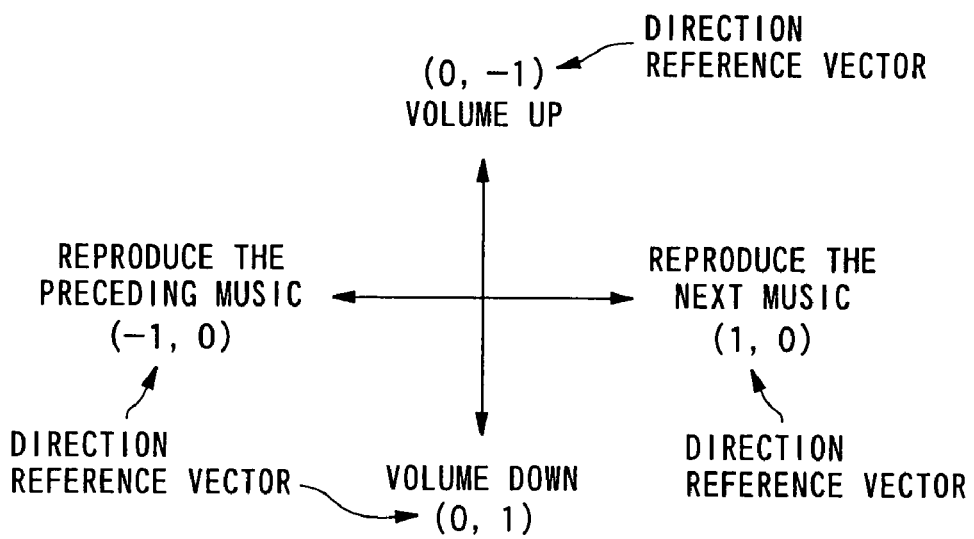
FIG. 11A is an explanatory diagram of a command correspondence table stored in the storage 1.
FIG. 11B is an explanatory diagram showing the relation between direction vectors and commands.

The direction reference vector is expressed by using unit vectors in the right direction (1,0), in the left direction (−1,0), in the upward direction (0,1), and the downward direction (0,−1). In the storage 1, the direction reference vectors, corresponding command information F, and corresponding commands are pre-stored as a command correspondence table (refer to FIG. 11A). FIG. 11B is an explanatory diagram showing the relations between the direction vectors and the commands.

In the case where a direction reference vector matched to the average motion vector $LD_m$ obtained in the process of step S79 is (−1,0), command information F1 is obtained. In the case where the matched direction reference vector is (1,0), command information F2 is obtained. Similarly, in the case where the average motion vector $LD_m$ matches the direction reference vector (0,−1), command information F3 is obtained. In the case where it matches the direction reference vector (0,1), command information F4 is obtained in step S80.

More concretely, for example, the norm of the average motion vector LDm obtained in step S79 is normalized to 1, thereby calculating a normalized average motion vector LDm'. The inner products between the normalized average motion vector LDm' and the following four direction reference vectors are computed. Specifically, when the normalized average motion vector LDm'=(0.1513, 0.9885), the inner product with the direction reference vector (1,0) is 0.1513. Similarly, the inner product with the direction reference vector (−1,0) is −0.1513, the inner product with the direction reference vector (0,1) is 0.9885, and the inner product with the direction reference vector (0,−1) is −0.9885. The direction reference vector having the maximum inner product is the direction reference vector (0,1). In this case, it is recognized that a CD jacket moves upward, and the command information F4 corresponding to the direction reference vector (0,1) is obtained.

The obtained command information F is stored in the RAM or the like in the system controller 7. After that, the program shifts (returns) to the process of step S59 shown in the flowchart of FIG. 9, and the command recognizing process is finished.

In the process of step S59 in the flowchart of FIG. 9, the command information F stored in the RAM or the like is read on the basis of the process of the system controller 7. With reference to the command correspondence table stored in the storage 1, a predetermined command corresponding to the command information F is executed.

Specifically, when the command information F1 is obtained, a process of reproducing a music piece immediately preceding a music piece being currently reproduced is executed. When the command information F2 is obtained, a process of reproducing a music piece subsequent to the music piece being currently reproduced is executed. When the command information F3 is obtained, a volume increasing process is executed. When the command information F4 is obtained, a volume decreasing process is executed.

In the above-described second embodiment, when the user moves a CD jacket in a predetermined direction in the image capturing range of the camera 2A during reproduction of the content C, the movement is captured and detected. Thus, a command corresponding to the movement can be executed.

[2-1. Another Embodiments of Command Recognizing Process]

Next, another embodiment in the command recognizing process will be described.

Figure 12:
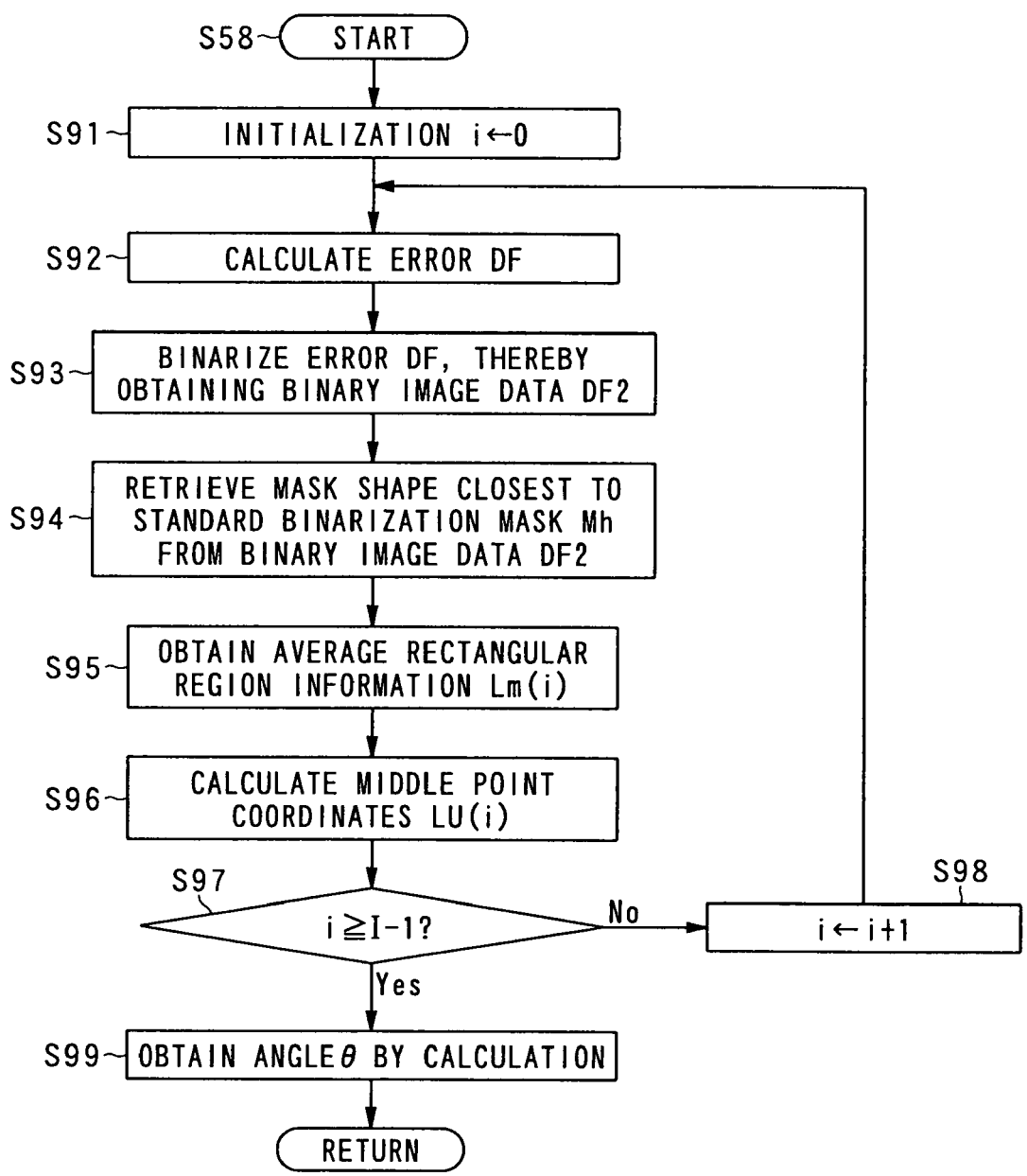
FIG. 12 is a flowchart showing the command recognizing process executed by the system controller 7 in another embodiment.

In the command recognizing process, the volume up/down of reproduction sound is recognized by the vertical movement of a CD (that is, the direction reference vector (0,1) or (0,−1) shown in FIGS. 11A and 11B). In audio devices, generally, the volume is often controlled by turning a volume knob circularly. In the following another embodiment, processes of turning a CD jacket in the image capturing range of the camera 2A like the volume knob is turned and, on the basis of the rotation angle, recognizing the volume up/down will be described concretely by using the flowchart of FIG. 12.

The processes shown in the flowchart are executed under control of the system controller 7 on the basis of a program pre-stored in a not-shown ROM or the like in the system controller 7.

First, sampling time "i" is initialized to 0 (step S91). Next, an image is obtained by the image obtaining means 2. The obtained image is used as image data indicative of a present image, and an error DF(x,y,t) between the obtained image and the background image data DB is calculated (step S92). The calculated error DF(x,y,t) is binarized, thereby obtaining binary image data DF2 (step S93). A binarization mask shape closest to the shape of the standard binarization mask Mh indicative of a rectangular shape corresponding to a CD jacket is retrieved from the obtained binary image data DF2 (step S94).

Since the processes in the steps S91 to S94 are similar to those in the steps S71 to S74 in "1-1. Command Recognizing Process" (that is, similar to the processes in steps S21 to S24 in the target medium image data obtaining process described in detail in the first embodiment), the detailed description will not be repeated.

Next, LTL(i) and LTR(i) as coordinates at two vertexes of the upper side of the retrieved mask shape are obtained. In a manner similar to the processes in steps S21 to S28 in the target medium image data obtaining process described in detail in the first embodiment, processes of obtaining LTL(i) and LTR(i) as coordinates of two vertexes are repeated. The obtained coordinates of the two vertexes are averaged as the average rectangular region information $L_m(i)$, thereby obtaining average coordinates $LTL_m(i)$ and $LTR_m(i)$ of two vertexes (step S95).

Further, by using the average rectangular region information $L_m(i)$ obtained in step S95, coordinates LU(i) of the middle point of the upper side at each time are calculated and obtained by the following equation 8 (step S96).

[Equation 8]

$$LU(i)=0.5*(LTL_m(i)+LTR_m(i)) \qquad (EQ. 8)$$

Whether the sampling time "i" has lapsed predetermined sampling time I or not is determined (step S97). When it has not lapsed the predetermined sampling time I (No in step S97), the sampling time "i" is changed to "i+1" (step S98), and the program shifts to the process of step S92. The image data is monitored again, and image data corresponding to the image data of the present image is obtained. By repeating the processes in steps S92 to S98, the middle point coordinates LU(i) are sequentially obtained. The obtained middle point coordinates LU(i) are temporarily stored in the RAM or the like in the system controller 7.

On the other hand, in the case where it is determined in the process of step S97 that the sampling time "i" has lapsed the predetermined sampling time I (Yes in step S97), the middle point coordinates LU(i) obtained in step S96 are read from the RAM or the like in the system controller 7. Based on the history of the movement of the middle point coordinates LU(i), the angle θ by which the user turns the CD jacket is calculated (step S99).

The computed angle θ is stored in the RAM or the like in the system controller 7. After that, the program shifts (returns) to the process in step S59 shown in the flowchart of FIG. 9 and finishes the command recognizing process.

Figure 13:
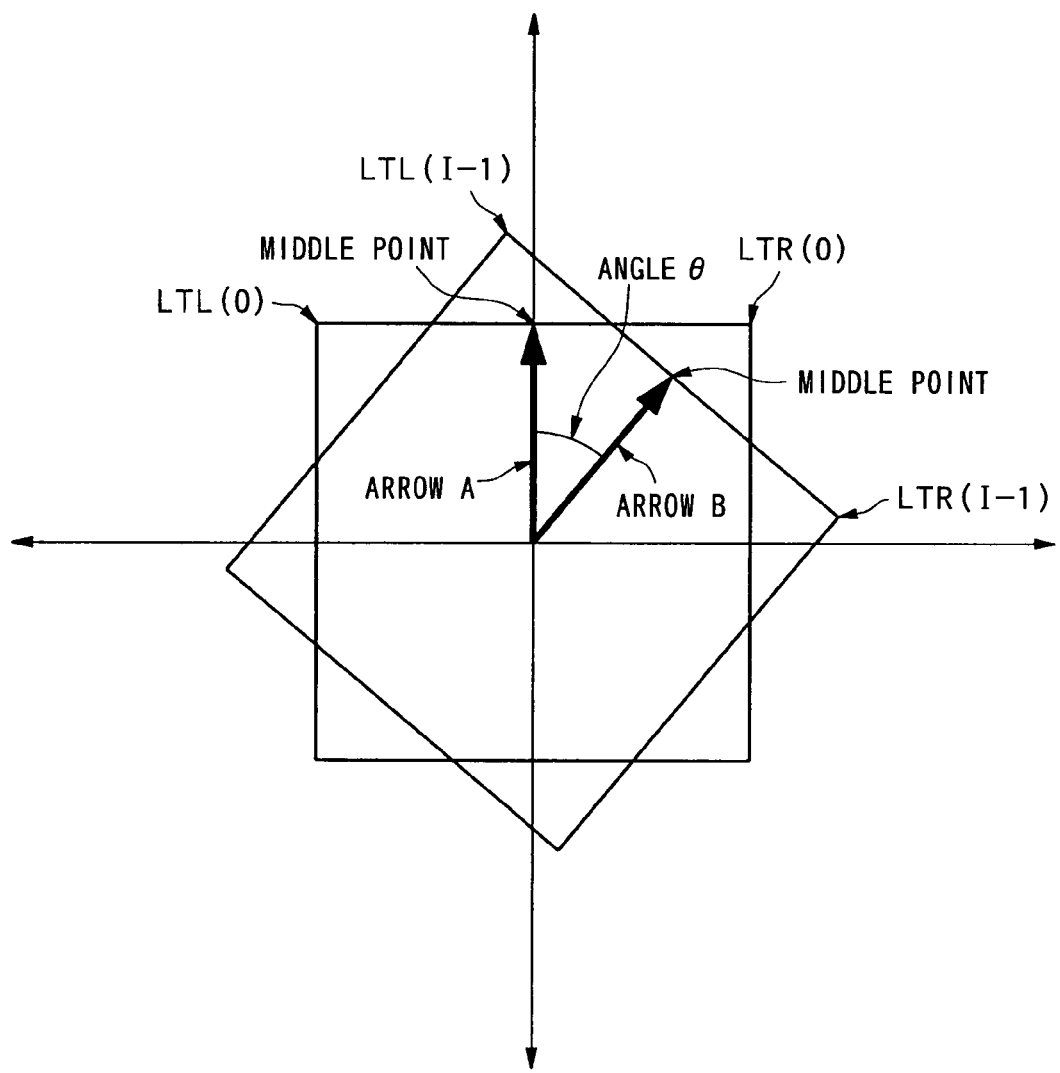
FIG. 13 is an explanatory diagram of a rotation angle θ of a CD jacket in another embodiment.

To obtain the rotation angle θ from the history of the movement of the middle point coordinates LU(i) in step S99, various methods are considered. For example, from the coordinates $LTL_m(0)$ and $LTR_m(0)$ of two vertexes included in the average rectangular region information $L_m(0)$ obtained in step S95, the length of the upper side of the CD jacket can be estimated. The arrow A extending from the center of the CD jacket to the middle point as shown in FIG. 13 can be obtained.

Similarly, the arrow B extending from the center of the CD jacket rotated by the angle θ to the middle point can be determined from the coordinates $LTL_m(I-1)$ and $LTR_m(I-1)$ of two vertexes included in the average rectangular region information $L_m(I-1)$ obtained in step S95. A fan shape is formed from the information of the arrows A and B and the history of the middle point coordinates, and the angle θ can be obtained from the information.

When the CD jacket has a square shape, the binary image data DF2 obtained in step S93 is temporarily stored in the RAM or the like in the system controller 7, and is collated with image data after the turn in the process of step S99, thereby discriminating the case where the angle θ is 0 and the case where the angle θ is 90 degrees from each other. As another method, the sides in the lateral direction of the standard binarization mask Mh are set to be longer than those in the vertical direction so that the case where the angle θ is 0 and the case where the angle θ is 90 degrees can be discriminated from each other.

The program shifts to step S59 in the flowchart of FIG. 9, and the process of increasing/decreasing the volume is performed so as to be adapted to the angle θ.

In general audio systems, the more the angle of turning the volume knob increases, the larger the volume becomes. Therefore, it is preferable to make the angle θ and the volume proportional to each other in such a manner that when the volume at the angle θ of rotation is 45 degrees is +45 dB, the volume is +15 dB at 15 degrees and is +30 dB at 30 degrees. It is also preferable that the volume decreases when the angle θ of rotation becomes negative.

The invention claimed is:

1. A processor comprising:
 a storing device which stores at least one piece of content information so as to be associated with related-image information of an image related to the content information;
 a target image information obtaining device which obtains target image information by capturing an image of an object related to the content information to be processed;
 a motion detecting device which detects motion of the object related to the content information; and
 an information obtaining device which collates the obtained image information to be processed with the related-image information stored in the storing means and obtains the content information corresponding to the target image information from the storing device;
 wherein it is judged whether the content information obtained by the information obtaining device is being presently reproduced, and as a result of judgment, in a case where it is not being presently reproduced, the content information is reproduced, and in a case where it is being presently reproduced, a process corresponding to the motion of the object detected by the motion detecting device is performed for the content information being reproduced.

2. The processor according to claim 1, wherein the storing device stores shape information indicative of shape of the object, and
 the target image information obtaining device obtains the target image information on the basis of the shape information.

3. The processor according to claim 2, wherein the target image information obtaining device further comprises:
 a background image information obtaining device which obtains background image information by capturing an image of an image capturing range in which the object is to be imaged;
 an object image information obtaining device which obtains object image information by capturing an image of the object in the image capturing range;
 a differential information obtaining device which obtains differential image information indicative of difference between the background image information and the object image information; and
 a region extracting device which extracts a region corresponding to the shape information stored in the storing device from an image region indicated by the differential image information,
 wherein the target image information is obtained on the basis of the region extracted by the region extracting device.

4. The processor according to claim 3,
 wherein the target image information obtaining device performs a process so that the size of the region extracted by the region extracting device becomes the same as that of the image displayed on the basis of the shape information stored in the storing device, thereby obtaining the target image information.

5. The processor according to any one of claims 1 to 4,
 wherein the content information stored in the storing device is recording content information which is recorded in an information recording medium, and
 the object is an object related to the information recording medium.

6. The processor according to claim 5,
 wherein the related-image information is an image of a package of the information recording medium, and
 the shape information shows the shape of a package of the information recording medium.

7. The processor according to claim 6,
 wherein the object is a package of the information recording medium or a printed matter of a package of the information recording medium.

8. The processor according to claim 5,
 wherein the related-image information is an image of a face of the information recording medium itself,
 the object is the information recording medium itself, and
 the shape information indicates the shape of the face of the information recording medium itself.

9. The processor according to any one of claims 1 to 4, wherein the content information stored in the storing device is content information obtained via a network.

10. A processor, wherein the processor according to any one of claims 1 to 4 and 6 to 8 is an information recording/reproducing apparatus.

11. A processor, wherein the processor according to claim 5 is an information recording/reproducing apparatus.

12. A processor, wherein the processor according to claim 9 is an information recording/reproducing apparatus.

* * * * *